United States Patent [19]
Crowther

[11] 3,853,960
[45] Dec. 10, 1974

[54] PROCESS FOR THE MANUFACTURE OF PENTHAERYTHRITOL TETRACARBAMATE

[75] Inventor: Milton Crowther, Salisbury, N.C.

[73] Assignee: Proctor Chemical Company, Inc., Salisbury, N.C.

[22] Filed: May 9, 1972

[21] Appl. No.: 251,676

Related U.S. Application Data

[63] Continuation of Ser. No. 54,637, July 13, 1970, abandoned.

[52] U.S. Cl............................................. 260/482 B
[51] Int. Cl........................................... C07c 125/04
[58] Field of Search ............................... 260/482 B

[56] References Cited
UNITED STATES PATENTS
2,694,690   11/1954   D'Alelio..................... 260/482 B OTHER PUBLICATIONS
Rheineck, A. E. et al. Fette–Seifen–Anstrichmittel, 70, No. 6, 1968.

Primary Examiner—Lorraine A. Weinberger
Assistant Examiner—Paul J. Killos
Attorney, Agent, or Firm—Kemon, Palmer & Estabrook

[57] ABSTRACT

Pentaerythritol tetracarbamate, as a new compound, is prepared by transesterification of pentaerythritol with a carbamate ester of a low boiling alcohol, e.g., C1–C4 alkanols. The PETC is recovered by filtration from the remainder of the reaction mass which is liquid at temperatures above 90°C. in which the PETC is insoluble.

7 Claims, No Drawings

PROCESS FOR THE MANUFACTURE OF PENTHAERYTHRITAL TETRACARBAMATE

This application is a continuation of application Ser. No. 054,637, filed July 13, 1970, now abandoned.

BACKGROUND OF THE INVENTION

1. Field of the Invention

This invention relates to a new compound, namely, pentaerythritol tetracarbamate and methods for preparing it by transesterification of pentaerythritol with a lower alkyl carbamate. Additionally, the invention relates to methylol derivatives of this new compound, to textile treating compositions containing such methylol derivatives, methods of treating textiles to impart crease-resistant properties thereto and the resulting treated fabrics.

2. Description of the Prior Art

It is known to form polycarbamates of polyols by transesterification of a polyol with a lower alkyl carbamate. For example, U.S. Pat. Nos. 2,917,535 and 2,934,559 disclose the preparation of alkane diol dicarbamates by this method. Various catalysts may be used in accelerating the transesterification including aluminum alkoxides (see U.S. Pat. No. 2,934,559) and stannic chloride (see U.S. Pat. No. 3,219,686).

The usual method is to dissolve the polyol in excess melted lower alkyl carbamate in combination with small amounts of the catalyst. The mixture is heated carefully until transesterification begins and the lower alcohol is distilled. Special techniques may be employed, such as use of reduced pressures, in order to force the reaction toward production of maximum amount of the desired product (see U.S. Pat. No. 3,173,941). In these known operations, the resulting polyol polycarbamate is recovered by addition of water from which the desired product is crystallized (see U.S. Pat. No. 3,173,941) or by vacuum distillation from the reaction mixture of more volatile materials leaving the polycarbamate as residue (see U.S. Pat. No. 2,934,559). Overall yield and product quality may be low due to difficulty of isolating the product from the reaction media.

SUMMARY OF THE INVENTION

According to the present invention through the production of pentaerythritol tetracarbamate is accomplished by transesterification of pentaerythritol with a carbamate ester of an alcohol having a boiling point below about 150°C. and separating pentaerythritol tetracarbamate as insoluble product by filtration from the reaction mass at a temperature between about 90° to 150°C. The resulting product has a melting point of about 232°–234°C. and an infrared ray absorption spectrum exhibiting major absorption peaks at 2.9, 3.0, 5.8, 6.2, 7.0, 7.3, 9.1, 18.5, and 20.0 microns.

The success of the present invention is, also, in part, due to the discovery that the preparation of the tetracarbamate of pentaerythritol is unique in that this material is highly insoluble in the lower carbamates from which it can be formed, in alcohols and in water, and that it has a melting point higher than the melting point of the lower alkyl carbamates from which it is formed by transesterification whereby the resulting product may be recovered by filtration of the reaction mass which is heated to a temperature between about 90° to 150°C. at which the components of the reaction mass, other than the desired product, are in the liquid phase.

In forming the transesterification, various catalysts may be used including aluminum alkoxides, zinc oxide, although dibutyl tin oxide is particularly effective and is preferred.

DESCRIPTION OF PREFERRED EMBODIMENTS

A more complete understanding of the new methods and products of this invention may be obtained from the following description of representative operations and results. In reporting these data and throughout the remaining specification and claims, all parts and percentages are by weight.

EXAMPLE 1

There was charged into a reaction vessel equipped with external heating mantle, internal stirrer, thermometer, and distillation column equipped with reflux trap, 612 parts of pentaerythritol, 3,200 parts of ethyl carbamate and 12.2 parts of dibutyl tin oxide. The charge was heated and, as it became fluid, stirring was commenced. As heating with agitation was continued, transesterification began at a temperature of about 135°C. shown by start of ethanol distillation into the reflux trap. The heating and agitation were continued over a period of about five hours during which the temperature slowly rose to 170°C. When 832 parts of ethanol had been collected, the contents of the reaction vessel were cooled to 90°C. and then passed through a centrifuge. The supernatant liquid (filtrate), consisting mainly of unreacted ethyl carbamate, was collected for use as feed stock for a subsequent run.

The recovered solid product, which amounted to 1920 parts of finely divided white powder, was divided into a major portion to remain as unrefined product for use in further processes. The minor portion was extracted with water to remove occluded impurities and obtain a refined product. This was subjected, after vacuum drying, to analytical tests that revealed the following properties for the resulting pentaerythritol tetracarbamate:

Melting Point 232–234°C.
Nitrogen Content 18.45%
IR Absorption spectra having major absorption peaks at 2.9, 3.0, 5.8, 6.2, 7.0, 7.3, 9.1, 18.5 and 20.0 microns.

EXAMPLE 2

One hundred parts of the unrefined product of Example 1 were mixed with 253 parts of 37% formaldehyde. The pH of the mixture was adjusted to 10 using 25% NaOH aqueous solution and the refluxed for two hours. The resulting solution was cooled, the pH adjusted to 7.0 and water added to make a total of 387 parts of a clear, colorless solution of tetramethylol pentaerythritol tetracarbamate.

EXAMPLE 3

The procedure of Example 1 was repeated using butyl carbamate instead of ethyl carbamate and a partial vacuum applied to the reaction vessel to aid in removal of butyl alcohol. Results comparable to Example 1 were obtained.

In yet other cases, propyl, isobutyl and methyl carbamates in amounts of about 8 mols per mol of pentaerythritol were used instead of ethyl carbamate with good results.

EXAMPLE 4

Into a reaction vessel similar to that of Example 1 but also equipped with mercury manometer and vacuum pump, there were charged 136 parts of pentaerythritol, 952 parts of beta-methoxyethyl carbamate and 2.2 parts of dibutyl tin oxide. The mixture was carefully heated until fluid when stirring was commenced. A vacuum of 150 mm. Hg. was applied to the top of the reflux condenser and heating was continued until at 140°C., methoxyethanol began to distill. As reaction continued and distillation decreased, vacuum was increased until at 159°C. pot temperature and 95 mm. Hg., there had been collected in the reflux trap, 304 parts of methoxyethanol. The residue in the reaction vessel was cooled to 120°C. and passed through a centrifuge. The solids collected in the centrifuge were slurried with warm (50°C.) water and again passed through the centrifuge. After thorough drying, 280 parts of fine white crystals of pentaerythritol tetracarbamate were obtained.

EXAMPLE 5

A solution composed of 25 percent of the product of Example 2, 3% $ZnCl_2$, 0.1% "Tergitol NPX" surfactant (nonyl phenyl polyethylene glycol ether), and 71.9% $H_2O$ was padded onto cotton broadcloth so that pick-up of solution was approximately 100 percent. The fabric was dried on a steam press; then heated in a curing oven at 340°C. for 90 seconds.

After conditioning overnight, the fabric was tested according to established industry methods together with some of the untreated fabric. The following test results were obtained:

| Test | Treated | Untreated |
|---|---|---|
| 1. AATCC Test Method 124-1967 | 4.9 | 1 |
| 2. After repeating Test 124-1969 5 times | 4.8 | 1 |
| 3. Tear strength in warp direction Federal Specification CCC-191B Method 4132 | 272 gms. | 512 gms. |
| 4. Tensile strength in warp direction Federal Specification CCC-TA1B Method 5100 | 38 lbs. | 60 lbs. |
| 5. Crease Angle Recovery — AATCC Test Method 66-1968 warp & filling | 299° | 160° |
| 6. Chlorine Retained tensile loss AATCC Test Method 92-1967 | −2.85% | 0 |

DISCUSSION OF DETAILS

An essential reagent for use in carrying out the processes of this invention is a carbamate ester of an alcohol having a boiling point below 150°C. Ethyl carbamate is a preferred reagent because of its availability and the ease with which the by-product ethanol can be removed from the reaction mass. Other useable carbamate esters include:

methyl carbamate
propyl carbamate
butyl carbamate
isobutyl carbamate
2-methoxy ethyl carbamate
2,2-dichloroethyl carbamate
2-dimethyl amino ethyl carbamate
2-ethoxy ethyl carbamate Mixtures of carbamate esters may be used, e.g., to form low boiling distillation mixtures or low temperature eutectic melting reaction masses. As a class, the alkyl carbamates containing one to four carbon atoms in the alkyl group or mixtures of such esters are preferred for use in the new methods.

The carbamate ester is advantageously employed in a proportion relative to the pentaerythritol in the molecular excess of that required to form the tetracarbamate, i.e., at least four mols of the carbamate ester per mol of pentaerythritol. Advantageously, one uses 6 to 10 mols of the carbamate ester per mol of pentaerythritol.

Although the transesterification reaction can be conducted without use of catalyst, addition of a catalyst to the reaction mixture to promote the transesterification is preferred. Advantageously, between the 0.1 and 1 percent and especially 0.2 to 0.5%, based upon the combined weight of pentaerythritol and carbamate ester is used. Although dibutyl tin oxide is preferred as the catalyst, other useable catalysts include zinc oxide, aluminum isopropoxide, stannic chloride, aluminum N-butoxide and the like.

The pentaerythritol and carbamate ester should be thoroughly mixed together in conducting the transesterification. This is best accomplished by pulverizing or otherwise subdividing the reactants and mixing them together, such as in the tumbling barrel, in paddle mixers, or the like, before charging to a reaction vessel. An alternative method is to use an inert diluent in which the reactants can be dissolved or slurried. A particular advantage in the process can be obtained by using an inert diluent which forms an azeotropic mixture with the alcohol generated by the transesterification. Diluents or solvents which may be employed include chlorobenzene, toluene, xylene, hexylamine, 1,3-dioxane and the like.

The transesterification reaction can be carried out in any suitable apparatus equipped with means to agitate the reaction mass and to remove volatile products resulting from the reaction, e.g., the alcohol produced from the carbamate ester by the reaction. Temperatures between 135° and 170°C. are advantageously employed. Heating to a temperature above 180°C. is to be avoided since decomposition of desired product may occur at such higher temperatures. If carbamate esters of higher boiling alcohols are used as a reactant, vacuum may be applied to the reaction vessel to aid in the removal of by-product alcohol. Vacuums in the range of 50 to 150 mm. Hg. are useful for this purpose.

The preparation of pentaerythritol tetracarbamate in accordance with the invention is unique because of the ability of the desired product to be separated from byproducts of the transesterification without recourse to complicated recovery methods. As previously indicated, the PETC is highly insoluble in the carbamate ester from which it is formed and in alcohols and water. Pentaerythritol per se is soluble in these carbamate esters. Further, the reaction mixtures, aside from the insoluble desired product, can be rendered fluid by heating to temperatures between 90° and 150°C. This discovery enables desired product to be readily separated by centrifuging or filtration of the reaction mass heated within this temperature range. Further refinement of the recovered product can be carried out by extraction with water or lower alkanols, but this is unnecessary if the product is to be used as an intermediate in the formation of methylol derivatives for the treatment of cellulosic fabrics, production of coatings or resins or for other purposes.

Methylol derivatives of pentaerythritol tetracarbamate constitute new products of commercial importance, particularly for use in finishing fabrics comprising cellulosic fibers. They have a high ratio of hydroxyl groups per unit weight which are reactive with cellulose molecules and have been found to be highly effective as crease-proofing agents for cellulosic fabrics. Further, from a cost viewpoint, they are attractive since they may be produced from relatively inexpensive materials, i.e., the consumed chemicals would be pentaerythritol, urea and formaldehyde in a mol ratio of 1 to 4 to 10.

Methylol derivatives of pentaerythritol tetracarbamate of the invention may have 1 to 8 methylol groups. The tetramethylol derivatives containing 5 to 7 methylol groups are the preferred products, but derivatives having less degree of substitution can be prepared and are useable in textile treating operations, e.g., the dimethylol and trimethylol derivatives. Products prepared in accordance with the invention on a commercial scale may comprise mixtures of the individual compounds as well as partial polymerization products thereof. The extent of any such partial condensation materials in the methylol derivatives should be below that which could cause insolubilization in water.

The embodiments of the invention in which an exclusive property or right is claimed are defined as follows:

1. A process for the manufacture of pentaerythritol tetracarbamate which comprises:
   a. providing a reaction mixture consisting essentially of pentaerythritol, 6 to 10 mols of a carbamate ester of an alkanol having a boiling point below 150°C. for each mol of pentaerythritol and between about 0.1 to 10 percent of a transesterification catalyst based upon the combined weight of pentaerythritol and said ester,
   b. heating the reaction mixture to a temperature between 135° and 170°C. to produce transesterification between the pentaerythritol and said ester,
   c. removing alkanol produced by said transesterification from the reaction mixture by distillation,
   d. adjusting the temperature of the resulting reaction mass to between 90° and 150°C., and
   e. separating pentaerythritol tetracarbamate existing as insoluble product in the reaction mass from the remainder of the reaction mass existing as liquid portion at said temperature between 90° and 150°C.

2. A process for the manufacture of pentaerythritol tetracarbamate which comprises:
   a. providing a reaction mixture consisting essentially of pentaerythritol, 6 to 10 mols of ethyl carbamate for each mol of pentaerythritol and between about 0.1 to 10 percent of a transesterification catalyst based upon the combined weight of pentaerythritol and ethyl carbamate,
   b. heating the reaction mixture to a temperature to produce transesterification between pentaerythritol and ethyl carbamate,
   c. removing ethanol from the reaction mixture by distillation,
   d. adjusting the temperature of the resulting reaction mass to between 90° and 150°C, and
   e. separating pentaerythritol tetracarbamate existing as insoluble product in the reaction mass from the remainder of the reaction mass existing as liquid portion at said temperature between 90° and 150°C.

3. The process of claim 1 wherein said catalyst is dibutyl tin oxide.

4. In the process of manufacture of pentaerythritol tetracarbamate by transesterification of pentaerythritol with a lower alkyl carbamate ester and lower alkanol is distilled from the reaction mixture leaving an alkanol denuded reaction mass, the improvement which comprises:
   A. adjusting the temperature of the denuded reaction mass to between 90° and 150°C, and
   B. separating pentaerythritol tetracarbamate existing as insoluble product in said reaction mass from the remainder of the reaction mass existing as liquid portion at said temperature between 90° and 150°C.

5. In the process of manufacture of pentaerythritol tetracarbamate by transesterification of pentaerythritol with ethyl carbamate and ethanol is distilled from the reaction mixture leaving an ethanol denuded reaction mass, the improvement which comprises:
   A. adjusting the temperature of the denuded reaction mass to about 90°C, and
   B. centrifuging the temperature adjusted reaction mass to recover pentaerythrital tetracarbamate as finely divided powder.

6. In the process of manufacture of pentaerythritol tetracarbamate by transesterification of pentaerythritol with a carbamate ester of a monohydric alcohol having a boiling point below 150°C and monohydric alcohol produced by the transesterification is distilled from the reaction mixture leaving an alcohol denuded reaction mass, the improvement which comprises:
   A. adjusting the temperature of the denuded reaction mass to between 90° and 150°C, and
   B. separating pentaerythritol tetracarbamate existing as insoluble product in the reaction mass existing as liquid portion at said temperature between 90° and 150°C.

7. The process of claim 1 wherein said catalyst is selected from the group consisting of aluminum alkoxides, zinc oxide and dialkyl tin oxides.

* * * * *

UNITED STATES PATENT OFFICE
CERTIFICATE OF CORRECTION

Patent No. 3,853,960         Dated December 10, 1974

Inventor(s)  Milton Crowther

It is certified that error appears in the above-identified patent and that said Letters Patent are hereby corrected as shown below:

Column 2, line 54, "the refluxed" should read
--then refluxed--

Column 5, line 32, "tetramethylol" should read
--tetracarbamate--.

Signed and sealed this 10th day of June 1975.

(SEAL)
Attest:

RUTH C. MASON
Attesting Officer

C. MARSHALL DANN
Commissioner of Patents
and Trademarks